US012801380B2

(12) United States Patent
Laigle

(10) Patent No.: US 12,801,380 B2
(45) Date of Patent: *Nov. 17, 2026

(54) WEB SERVICES LAYER FOR EXECUTION IN A CLOUD COMPUTING ENVIRONMENT

(71) Applicant: International Business Machines Corporation, Armonk, NY (US)

(72) Inventor: Jean-Marie Jacques Claude Laigle, Golden, CO (US)

(73) Assignee: International Business Machines Corporation, Armonk, NY (US)

( * ) Notice: Subject to any disclaimer, the term of this patent is extended or adjusted under 35 U.S.C. 154(b) by 330 days.

This patent is subject to a terminal disclaimer.

(21) Appl. No.: 18/784,606

(22) Filed: Jul. 25, 2024

(65) Prior Publication Data

US 2024/0378050 A1 Nov. 14, 2024

Related U.S. Application Data

(63) Continuation of application No. 17/966,715, filed on Oct. 14, 2022, now Pat. No. 12,061,900.

(Continued)

(51) Int. Cl.

| | |
|---|---|
| ***G06F 8/71*** | (2018.01) |
| ***G06F 8/38*** | (2018.01) |
| ***G06F 9/54*** | (2006.01) |

(52) U.S. Cl.

CPC .................. *G06F 8/71* (2013.01); *G06F 8/38* (2013.01); *G06F 9/547* (2013.01)

(58) Field of Classification Search

None

See application file for complete search history.

(56) References Cited

U.S. PATENT DOCUMENTS

| | | |
|---|---|---|
| 8,001,555 B2 | 8/2011 | Hellenthal et al. |
| 8,930,916 B1 | 1/2015 | Soeder et al. |

(Continued)

FOREIGN PATENT DOCUMENTS

| | | |
|---|---|---|
| WO | WO 2007/081979 | 7/2007 |
| WO | WO 2009/111799 | 9/2009 |

OTHER PUBLICATIONS cloud.google.com [online], "Creating an API proxy from an OpenAPI Specification," Apr. 19, 2022, retrieved on Apr. 20, 2022, retrieved from URL<https://cloud.google.com/apigee/docs/api-platform/tutorials/create-api-proxy-openapi-spec>, 13 pages.

(Continued)

*Primary Examiner* — Qing Chen

(74) *Attorney, Agent, or Firm* — CANTOR COLBURN LLP; Monchai Chuaychoo

(57) ABSTRACT

Methods, systems, and apparatus, including computer programs encoded on computer-storage media, for web application generation. In some implementations, a method includes receiving an identifier for code written for execution on a local device; determining, by analyzing the code, contextual information for executing the code; generating, using the contextual information, a web services layer for the code that enables execution of the code in a cloud computing environment; creating configuration settings i) for the code and ii) that include first data defining the web services layer and second data defining one or more access tokens, each access token enabling calling of a respective function in the code; and storing, in memory, the configuration settings for use during deployment of the code in response to receipt of a request to execute at least one function in the code.

20 Claims, 3 Drawing Sheets

Related U.S. Application Data

(60) Provisional application No. 63/342,540, filed on May 16, 2022.

(56) References Cited

U.S. PATENT DOCUMENTS

| | | | |
|---|---|---|---|
| 9,021,102 | B2 | 4/2015 | Pasternak |
| 9,417,994 | B2 | 8/2016 | Ellis et al. |
| 9,513,941 | B2 | 12/2016 | Feng et al. |
| 10,379,995 | B1 | 8/2019 | Walters et al. |
| 11,226,887 | B1 | 1/2022 | Sharifi Mehr |
| 2007/0033443 | A1 | 2/2007 | Tillmann et al. |
| 2007/0078988 | A1 | 4/2007 | Miloushev et al. |
| 2012/0151455 | A1 | 6/2012 | Tsantilis et al. |
| 2012/0185462 | A1 | 7/2012 | Albrecht et al. |
| 2014/0096224 | A1 | 4/2014 | Liu et al. |
| 2014/0317641 | A1 | 10/2014 | Trofin et al. |
| 2016/0248861 | A1 | 8/2016 | Lawson et al. |
| 2020/0259652 | A1 | 8/2020 | Schmaltz, III et al. |
| 2023/0367586 | A1 | 11/2023 | Laigle |

OTHER PUBLICATIONS docs.mulesoft.com [online], "Step 2. Design an API Specification," Dec 1, 2021, retrieved on Apr. 20, 2022, retrieved from URL<https://docs.mulesoft.com/general/api-led-design>, 8 pages.

docs.nunit.org [online], "Dynamic Test Cases Spec," Nov. 15, 2020, retrieved on Apr. 21, 2022, retrieved from URL<https://docs.nunit.org/articles/nunit/technical-notes/nunit-internals/specs/Dynamic-Test-Cases-Spechtml>, 4 pages.

WEB SERVICES LAYER FOR EXECUTION IN A CLOUD COMPUTING ENVIRONMENT

CROSS-REFERENCE TO RELATED APPLICATION

This application is a continuation of U.S. patent application Ser. No. 17/966,715 (issued as U.S. Pat. No. 12,061, 900), filed on Oct. 14, 2022, which claims the benefit of U.S. Provisional Application No. 63/342,540, filed on May 16, 2022, the contents of which are incorporated by reference herein.

BACKGROUND

Developers can deploy code on cloud computing environments. For instance, a developer can write code for execution on a cloud computing environment, such as Amazon Web Services, Microsoft Azure, or Google Cloud.

SUMMARY

In general, one aspect of the subject matter described in this specification can be embodied in methods that include the actions of receiving an identifier for code written for execution on a local device; determining, by analyzing the code, contextual information for executing the code; generating, using the contextual information, a web services layer for the code that enables execution of the code in a cloud computing environment; creating configuration settings i) for the code ii) that include first data defining the web services layer and second data defining one or more access tokens, each access token enabling calling of a respective function in the code; and storing, in memory, the configuration settings for use during deployment of the code in response to receipt of a request to execute at least one function in the code.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, receiving the identifier can include receiving a uniform resource identifier that indicates a location at which the code is stored. Receiving the identifier can include receiving data indicating a name for the code. Creating the configuration settings can include creating, for a function in the code and using the name for the code, an access token that enables calling the function. Receiving the identifier can include receiving the identifier for code not configured for deployment in a cloud computing environment. Receiving the identifier can include receiving the identifier for code written for command line execution on a local device.

In some implementations, generating the web services layer can include: performing an initial deployment of the code; determining, by analyzing execution of the code during the initial deployment, a likelihood that a function in the code will be called; determining whether the likelihood satisfies a likelihood threshold that indicates that an application programming interface call should be defined for the function; and in response to determining whether the likelihood satisfies the likelihood threshold, selectively adding an application programming interface call for the function to the web services layer when the likelihood satisfies the likelihood threshold or determining to skip adding an application programming interface call for the function to the web services layer when the likelihood does not satisfy the likelihood threshold. The method can include determining, for one or more functions in the code with respective likelihoods that satisfy the likelihood threshold, an input type and an output type for the function; generating input instructions for an input web user interface that includes a field of the input type; and generating output instructions for an output web user interface that includes a field of the output type. Creating the configuration settings can include creating the configuration settings that include the input instructions and the output instructions. Creating the configuration settings can include determining, during the initial deployment of the code, one or more settings required to deploy the code in the cloud computing environment. Storing the configuration settings can include storing, in memory, the one or more settings required to deploy the code in the cloud computing environment.

In some implementations, determining the contextual information can include: determining, for one or more variables in the code, whether a value for the variable should be defined prior to execution of the code in response to receipt of a request to execute the code; determining, for variables from the one or more variables for which a value for the variable should be defined prior to execution of the code, a corresponding default value. Creating the configuration settings can include creating the configuration settings that include the corresponding default values for the variables from the one or more variables for which a value for the variable should be defined prior to execution of the code.

In some implementations, determining the contextual information can include determining whether a request, received a) while a first deployment of the code is deployed for a first device and b) from a second different device, for output from the code should be processed by the first deployment of the code or a second different deployment of the code. Creating the configuration settings can include creating the configuration settings that indicate whether a request, received a) while a first deployment of the code is deployed for a first device and b) from a second different device, for output from the code should be processed by the first deployment of the code or a second different deployment of the code. The method can include receiving, a) while a first deployment of the code is deployed for a first device and b) from a second different device, a request for output from the code; determining, using the configuration settings, whether to deploy a second different deployment of the code for the second different device; and providing, to the second different device, the output responsive to the request selectively using either the first deployment of the code or the second different deployment of the code in response to determining whether to deploy the second different deployment of the code for the second different device.

In some implementations, the method can include receiving, from a user device, a request a) for output from the code b) that includes one or more input values; deploying, in the cloud computing environment, the code using the configuration settings; providing, to the code deployed in the cloud computing environment, the one or more input values to cause the code to generate output data; and providing, to the user device, the output data. Receiving the request can include receiving, from the user device, the request that was entered in a command line terminal on the user device. Receiving the request can include receiving, from a local application executing on the user device, the request for output data that will be used by the local application. The method can include receiving, from the user device, a request for a web interface for the code; and providing, to the user device, instructions to cause presentation of the web interface for the code, wherein receiving the request comprises receiving, from the user device, the request that was entered in the web interface. The method can include receiving, from a first user device and for the deployment of the code, a first request (a) for first output from the code (b) that was entered in a web interface. Receiving the request can include receiving, from a second user device and for the deployment of the code, a second request (i) for second output form the code (ii) that was entered in a command line terminal on the user device.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various embodiments and may result in one or more of the following advantages. In some implementations, the systems and methods described in this specification can enable execution of a command line application in a cloud computing environment by generating a web services layer. In some implementations, the systems and methods described in this specification can enable faster deployment of code on a cloud computing platform using configuration settings compared to other systems. In some implementations, the systems and methods described in this specification can automatically determine default values for one or more variables required for execution of code, without which execution of the code would likely fail, by performing an initial deployment of the code, analyzing the code, or both. This can enable use of the code without receipt of input defining values for those variables, e.g., when a user does not know what the values for those variables should be. In some implementations, the systems and methods described in this specification can automatically determine an optimal hardware type on which code should be executed, e.g., to reduce computational resources usage, reduce execution time, or a combination of both.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
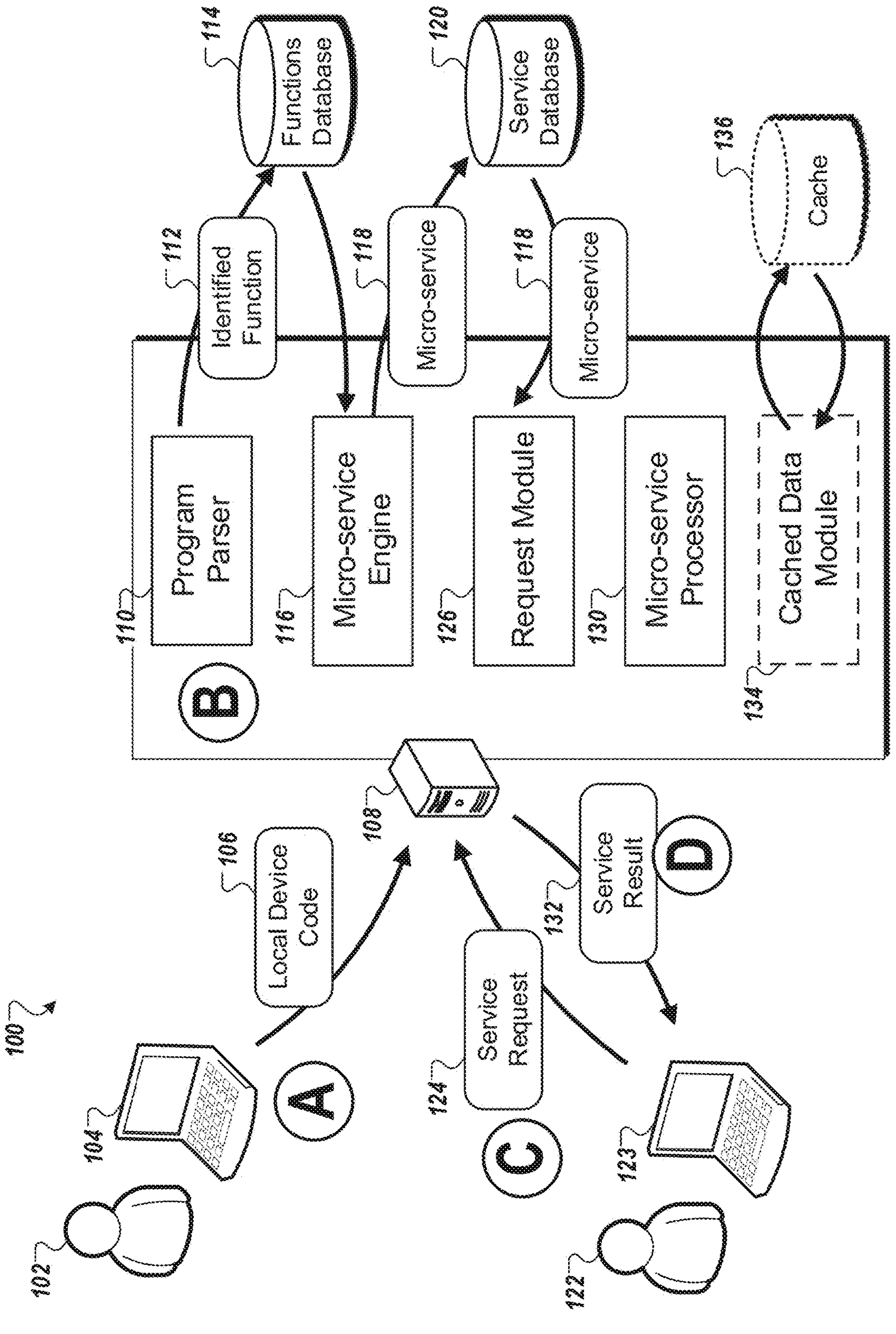
FIG. 1 is a diagram showing an example of a system for web application generation.

In general, a problem exists where people can write code, e.g., using Python or other language, that works well on their personal machines. However, the code can be difficult to share with another machine effectively. Issues with sharing can include package dependencies, user operating environment variables, conflicts with existing programs, among others). It is perhaps even more difficult to effectively share updates on the same code to ensure multiple machines in a group operate the same version of code. The issue is compounded for users that are not software engineers but, nevertheless, have computing needs which may be complex or highly individualized. Sharing code effectively can require numerous manual downloads of appropriate libraries, dependencies, source codes, among others. Such manual operations are time consuming and can lead to inaccuracies if components, or an updated version of a component are not installed correctly. Solutions described herein achieve a more efficient system for allowing multiple users access to shared code and provide an ability to generate usable output from the shared code in different environments.

For cloud computing environments, a developer can write code that is specifically developed for execution on a cloud computing platform. The developer can write the code using their knowledge of the cloud computing platform, including any application programming interfaces ("APIs") provided by the cloud computing platform. However, this requires that the developer know about the APIs and any other features specifically provided by the cloud computing platform.

To enable developers to deploy code onto a cloud computing platform without knowledge of the cloud computing platform, a deployment system can analyze non-cloud computing code to determine which functions in the code users should be allowed to call; contextual information for the calling of the functions, the execute of the code, or both; whether a cloud computing platform should allow concurrent execution of different instances or a single instance of the code; other parameters for cloud execution of the non-cloud computing code; or a combination of two or more of these. For instance, the deployment system can receive an identifier for code written for command line execution. The code can include a script, an application, or other appropriate code. In some examples, the code can include Python code.

The deployment system uses the identifier to access a copy of the code and analyzes the copy of the code. For instance, the deployment system can determine which functions included in the code an end user will typically call, contextual information for the code, or both. The contextual information can include variables that should be initialized prior to such a call, and values for those variables. The deployment system can infer values for those variables, e.g., default values, given programming norms, e.g., for the language in which the code is written, general programming community norms, or both.

In some examples, the deployment system can determine, e.g., as part of the contextual information, dependencies, dependency versions, or both, for the code. For example, the deployment system can determine that the code requires one or more libraries for execution and versions of those libraries, e.g., when different versions might not necessarily work or might work in a different manner.

The deployment system analyzes input and output types for the code. For instance, when the code is command line code, written for execution in a command line, the deployment system can analyze the code to determine input types for command line inputs, output types for command line outputs, or both.

The deployment system can use the input types and the output types to generate a web interface for the code. For example, when the deployment system determines that the code receives, as input, a vector of two or more numbers, the deployment system can generate an input user interface that includes a field that enables user input of the vector of two or more numbers. The deployment system can include, in the input user interface, text that indicates the expected input type for the code, e.g., to guide a user of the web interface in the expected input data type. Continuing the example, when the deployment system determines that the code generates, as output, a matrix of values, the deployment system can generate an output user interface that includes a field that presents the values from the matrix. The deployment system can include, in the output user interface, text that indicates the output type for the code.

In some examples, the deployment system can analyze the code, the contextual information, other appropriate information, or a combination of two or more of these, to determine an optimal hardware type on which to execute the code. The optimal hardware type can include physical hardware or virtual hardware. For instance, the deployment system can determine, using the input types, the output types, dependencies required by the code, types of data the code will generate, e.g., during runtime other than the output data such as a form of intermediate data, or a combination of two or more of these, to determine the optimal hardware type.

After the deployment system analyzes the code to determine the contextual information for the code, the deployment system can make an initial deployment of the code. As part of this initial deployment process, the deployment system can determine configuration settings for the code. The configuration settings can include settings for a web services layer for the code. For instance, the deployment system can create, during the initial deployment, a web services layer that includes one or more API calls for the functions that users should be allowed to call, that each have at least a threshold likelihood of being called by a user, or both.

Because the deployment system is not aware of the functions included in the code, the deployment system might not know which functions included in the code have at least the threshold likelihood of being called. To determine which functions have at least a threshold likelihood of being called, the deployment system might need to perform the initial deployment and execute one or more portions of the code during the initial deployment to determine, for each function included in the code, a likelihood that the function might be called by a user. The deployment system can compare, for each of the functions, the corresponding likelihood that the function might be called by a user with the threshold likelihood. For the functions that have likelihoods that satisfy the threshold likelihood, the deployment system can add an API call to the web services layer for the code.

In some implementations, the deployment system can determine whether a user should be allowed to call a function. For example, the deployment system can determine, from a security perspective for the code, whether execution of any particular function might raise at least a threshold likelihood of a security concern. The deployment system can add, to the web services layer for the code, an API call for the functions that have security likelihoods that satisfy the threshold likelihood of a security concern, e.g., that have likelihoods less than the threshold likelihood of a security concern.

The deployment system can store the configuration settings in memory, e.g., in a database. The deployment system can use the configuration settings during future deployments of the code in a cloud environment to create the web services layer that includes API calls for the code. The configuration settings can include data about the input user interface, the output user interface, the web services layer, other configuration settings for the code, or a combination of two or more of these. In this way, the deployment system can save computer resources by not continuously running the code while enabling faster deployment of the code when a request for the code is received from a user device than would be available without the configuration settings for the web services layer.

During runtime, the deployment system can receive requests to execute the code from the user interface. For instance, the deployment system can create a uniform resource identifier ("URI") for the code as part of the code analysis. The URI can be based on a name for the code, such as "application x." When the deployment system receives a request for the URI, the deployment system can cause presentation of the input user interface on the requesting device. The deployment system can use the configuration settings to generate data for the input user interface.

Upon receipt of input data in the input user interface, the deployment system can deploy an instance of the code, e.g., a daisi or a pebble. The deployment system can provide the input data to the code using the API calls for the web services layer. In response, the deployment system can receive output data generated by the code. The deployment system can cause presentation of the output data in the output user interface. The deployment system can use the configuration settings to generate the output user interface.

In some implementations, when creating the configuration settings for the code, the deployment system can create one or more ways in which the code can be executed by a user, e.g., each defined by a respective access token. Each access token can enable calling of at least a portion of the code in local application. A first access token can include the URI. For example, the deployment system can generate the URI using the name for the code, data for a developer who submitted the code to the deployment system, or both.

In some examples, the deployment system can generate a Python access token, a client URL ("cURL"), or another appropriate type of access token. A user device can use the access token to submit requests to a cloud environment executing the code and use a response to the request in a local environment. For example, the user device can execute a local application, e.g., a Python application or a productivity application. As part of the execution of the local application, the local application can use an access token for the code to submit a request to a cloud environment that includes input data for the code. The deployment system, or another component of a cloud computing platform, can receive the request and deploy the code in a cloud computing environment. The code can receive the input data and generate output data. The cloud computing platform can provide the output data to the user device for use during the execution of the local application.

In some implementations, the deployment system can enable local application access and web interface access to the code at the same time. For example, by creating both a URI and the access tokens for the code, the deployment system can enable a first user device to access the code using the URI and a second user device to access the code using an access token, e.g., in a location application such as a terminal window or a productivity application. The first device and the second device can be the same device, e.g., accessing the same deployment of the code, or different devices, e.g., accessing the same deployment or different deployments of the code.

FIG. 1 is a diagram showing an example of an environment 100 for web application generation. The environment 100 includes a first user device 104, a second user device 123, and a system 108. In some implementations, the system 108 obtains code written for execution on a local device. For example, the system 108 can obtain local device code 106 from the first user device 104. The system 108 can generate a service, such as a micro-service 118, using local device code 106. The system 108 can generate a service result 132, e.g., output from one or more user defined functions, in response to receiving a service request 124 using the micro-service 118.

In some implementations, the system 108 uses a cached data module 134 to store input and output data (e.g., from the service request 124 or the service result 132) in cache 136. For example, the system 108 can use the cache 136 to provide new output or results to a user device that provides input matching a cached input. In some cases, the system 108 can use the cache 136 to perform unit testing on a micro-service or an updated micro-service. The cache 136 can allow a user to perform unit testing without explicitly writing tests and thereby help ensure an accurate operation of a service.

In stage A, the first user device 104 provides the local device code 106 to the system 108. The first user device 104 can be controlled or otherwise operated by a user, e.g., a user 102. In some implementations, the local device code 106 includes a defined function. For example, the local device code 106 can define a function with a specific name and specific inputs and that generates specific output. In one example the local device code 106 can specify variables X, Y, Z as input and a sum of the variables as output of a defined function. In general, any functions defining any type of variables or function output can be defined in the local device code 106.

In stage B, a program parser 110 parses the local device code 106 after the system 108 accesses the local device code 106. In some implementations, the program parser 110 compares one or more characters in the local device code 106 to a set of known one or more characters. For example, the program parser 110 can identify a defined function (e.g., defined in Python) by comparing characters of the local device code 106 to the known set of characters, e.g., "def" or "def _" among others. The program parser 110 can identify a function as a set of instructions ranging from the identified function definition line to an output return line. The program parser 110 can store one or more identified functions, e.g., an identified function 112, in a database for stored functions 114. The system 108 can use the stored functions 114 to generate the micro-service 118.

In some implementations, the program parser 110 stores identified functions in the stored functions database 114 using a defined name. For example, the program parser 110 can parse one or more characters of the local device code. The program parser 110 can parse one or more characters that signify a function definition will follow. For example, in Python, a function can be defined using the letters DEF. A function name uniquely identifying the function can be written following the letters DEF (e.g., "sumxyz" can be a function name for a function that sums input variables X, Y, and Z). In some cases, the program parser 110 uses a defined name for function as a key to identify a function stored in the stored functions database 114.

In some implementations, the local device code 106 is stored in an online repository. For example, the user 102 can store the local device code 106 in an online repository such as GitHub or SourceForge. Instead of sending the local device code 106 to the system 108, the user 102 can use the first user device 104 to provide, to the system 108, a unique identifier identifying a storage location of the local device code 106 within an online repository. The online repository can include one or more servers storing data accessible to one or more users over the Internet. In some cases, the unique identifier can include a URL. The URL can direct the system 108 to an online repository that stores the local device code 106.

In some implementations, a micro-service engine 116 uses one or more functions in the stored functions database 114. For example, the micro-service engine 116 can obtain one or more functions from the stored functions 114. The one or more functions can include functions parsed by the program parser 110. In some implementations, the micro-service engine 116 obtains one or more functions referenced by one or more functions parsed by the program parser 110. For example, the local device code 106 can include code that references other code. The other code can include one or more functions from other repositories, e.g., other online repositories.

The referenced functions from the functions database 114 can be accessed in any appropriate manner. In some implementations, the program parser 110 identifies referenced functions and includes the referenced functions in the stored functions database 114. In some implementations, the micro-service engine 116 obtains referenced functions using the data in the stored functions database 114. For example, the program parser 110 can generate a unique identifier representing an online location for a referenced function. The micro-service engine 116 can parse the unique identifier and obtain the referenced function using the unique identifier. In some implementations, the online location includes a sub folder, parent folder, or a same folder that includes the local device code 106.

The micro-service engine 116 generates the micro-service 118. In general, a micro-service can include instructions for one or more functions. In some implementations, each micro-service operates a single function. A micro-service can be independently deployable or be used with other micro-services to provide results to one or more users. The micro-service engine 116 can store the micro-service 118 in the service database 120. In some implementations, the micro-service engine 116 generates the micro-service 118 as a web service layer. For example, the micro-service engine 116 can generate a web service layer using one or more functions stored in the functions database 114. The web service layer of the micro-service 118 can be used by the system 108 to generate output for service requests (e.g., the service request 124).

In stage C, the second user device 123 provides the service request 124 to the system 108. In some implementations, the service request 124 is provided by an application running on the second user device 123. For example, the second user device 123 can operate, as the application, a Python shell, an EXCEL spreadsheet, Visual Basic for Application (VBA) code, among others. The service request 124 can include an indication of provided input data and requested output data for a process operated by the second user device 123.

In some implementations, the service request 124 includes input. For example, for a service request requesting output from a function that provides a summation of X, Y, and Z, the request can include input specifying values for X, Y, and Z.

In some implementations, the service request 124 includes a service identifier. The service identifier can be an identifier for the requested micro-service 118. For example, the service identifier can include a path built from one or more of a user identification value (e.g., an identifier for the user 122 or the user 102), an identifying name of a generated micro-service (e.g., a name assigned by the system 108 to the micro-service 118), or an identifying name of a function (e.g., the name "sumxyz" identifying the function included in the generated micro-service 118).

The request module 126 of the system 108 can process the service request 124. For instance, the system 108 can receive the service request 124 from the second user device 123 and provide the service request 124 to the request module 126 for processing.

In some implementations, the request module 126 generates new input data using the input data of the service request 124 and a service identifier. For example, a service identifier of the service request 124 can identify a service that includes one or more functions for processing an image (e.g., coloring a black and white image using a machine learning network). The second user device 123 may provide an image as input. However, the form of the image may not match an expected input form of the service identified by the service identifier. The request module 126 can compare an expected form of input to the form of input received and determine whether they match. If not, the request module 126 can then generate new input that matches the expected form of input using the input data of the service request 124. The request module 126 can then provide the new input to the micro-service processor 130 for processing. If the expected form of input and the form of input received match, the request module 126 can provide the input received to the micro-service processor 130 for processing.

In some implementations, the request module 126 performs serialization of input data. For example, the request module 126 can receive an image to be processed by a service that processes images. However, the service expected input may be a serialized format for an image. If the request module 126 determines that received input data, e.g., input data in the service request 124, is not serialized or not serialized using a form of serialization expected by the given service, the request module 126 can perform serialization or re-serialization to generated new input data to be processed by the service.

In some implementations, conversion processes are stored in a lookup table. For example, the request module 126 can query a lookup table (e.g., generated by the system 108) using input of the service request 124 and an expected input or inputs for a service, such as micro-service 118. The request module 126 can obtain instructions for converting a received input to an expected input that matches an expected input for the service from the lookup table. In some implementations, the micro-service 118 includes one or more conversion processes. For example, the program parser 110 can identify conversion processes in the local device code 106. The request module 126 can use identified conversion processes to convert received input data. In some implementations, the micro-service 118 includes one or more likely conversion processes, such as image serialization from a JPEG image, among others.

The micro-service processor 130 generates output using one or more functions of the micro-service 118 and the service request 124 as input. In some implementations, the micro-service processor 130 operates one or more functions that are included in the micro-service 118. For example, the local device code 106 can include one or more functions written in JAVA, C++, Python, among others. In some implementations, the micro-service processor 130 processes the one or more functions of the micro-service 118 according to the instructions of a particular computer programming language. For example, the micro-service processor 130 can use a JAVA operating environment to generate output for a function written in JAVA in the local device code 106.

In some implementations, the service request 124 includes an operating environment of the second user device 123. For example, the service request 124 can include an indication that the micro-service 118 is being called within a C++ operating environment, such as within C++ code. If the micro-service 118 includes one or more functions written in another language than that of the operating environment (e.g., Python), the output of the one or more functions may not be correctly interpreted by the operating environment of the second user device 123 (e.g., C++ operating environment). The micro-service processor 130 can generate new function output and include the new function output in the service result 132.

In some implementations, the micro-service processor 130 queries a lookup table using the service request 124 and output of one or more functions of a service, such as the micro-service 118. For example, the micro-service processor 130 can query for instructions to convert a Python data structure to an object interpretable within a C++ operating environment, such as a program running in C++. In general, any type of operating environment objects or data structures can be converted to or from.

The request module 126 can obtain instructions for converting a received input to an expected input that matches an expected input for the service from the lookup table. In some implementations, the micro-service 118 includes one or more conversion processes. For example, the program parser 110 can identify conversion processes in the local device code 106. The request module 126 can use identified conversion processes to convert received input data. In some implementations, the micro-service 118 includes one or more likely conversion processes, such as image serialization from a JPEG image, among others.

If the service request 124 indicates an operating environment of the second user device 123 that does not match an operating environment of the micro-service 118, e.g., as determined by the request module 126 or the micro-service processor 130, the service result 132 can include new function input generated by the micro-service processor 130 using the service request 124 and a function output of the micro-service 118. If the service request 124 indicates an operating environment of the second user device 123 that does match an operating environment of the micro-service 118, the service result 132 might not include new function input but may include output generated from one or more functions of the micro-service 118.

In some implementations, the system 108 includes one or more processors that operate the micro-service processor 130. For example, the micro-service processor 130 can perform operations in parallel or threaded with other processes to process service requests from multiple users.

In stage D, the system 108 generates the service result 132 and provides the service result 132 to the second user device 123. In some implementations, the micro-service processor 130 generates the service result 132 using one or more outputs from functions of the micro-service 118. In some implementations, the micro-service processor 130 generates the service result 132 by generating one or more new outputs using the service request 124 and one or more outputs from functions of the micro-service 118.

In some implementations, the system 108 stores input data of the service request 124 and output data of the service result 132. For example, the cached data module 134 can store data indicating the input data of the service request 124 and output data of the service result 132. The cached data module 134 can use stored data in the cache 136 to provide service results more quickly, e.g., for input data and service requests that have already been processed, or testing of services, e.g., unit testing for updated services using previously obtained output to ensure updates have not broken a given service.

In some implementations, the cached data module 134 compares input data and a service identifier of a new service request to a previously stored input data and corresponding service identifier. For example, a new service request can include an identifier for a service identified by the string "sumxyz" and includes input data specifying values for X, Y, and Z. The cached data module 134 can compare the new input data and service identifier to previously stored data, e.g., in the cache 136. In general, the cache 136 includes one or more electronic memory storage devices. In some implementations, the cache 136 is cache memory for at least one computer of the system 108.

If the cached data module 134 determines the new data and identifier of the new service request matches previously stored data and an identifier, the cached data module 134 can provide the previously obtained result to the micro-service processor 130. This can allow the micro-service processor 130 to skip processing any functions and a result is obtained more efficiently and with less processing delay.

In some implementations, the cached data module 134 clears the cache 136, or a portion of the cache 136, in response to one or more detections. For example, the cached data module 134 can detect that one or more functions of a service have been updated. The updates can indicate that the function generates new output for a given input. The cached data module 134 can clear the portion of the cache 136 that stores data for the given function because the change to the function means the stored data would no longer be accurate.

In some implementations, changes to one or more functions of a service indicate if results will change or not. For example, a user of the environment 100 can submit updates to their code. With an update, a user can indicate whether or not the update is expected to change the output of the code. The system 108, or the cached data module 134, can parse the update data and update one or more functions (e.g., stored in the function database 114). The cached data module 134 can determine if the updates are expected to change the output of the code based on the indication provided by the user. If the output is expected to change, the cached data module 134 can clear a portion of the cache 136 storing data for the given function. If the output is not expected to change, the cached data module 134 can use stored data in the cache 136 to unit test the updated function to ensure the output is not changing. In this way, the environment 100 can perform automated unit testing and save users time while improve the accuracy of their code.

In some implementations, one or more of the stages can occur in parallel, at least in part. For instance, the program parser 110 can parse the local device code 106 while the second user device 123 provides the service request to the system 108. The service request can be a request for a micro-service for the local device code 106 or other code that the system 108 previously processed.

The system 108 is an example of a system implemented as computer programs on one or more computers in one or more locations, in which the systems, components, and techniques described in this specification are implemented. The user devices 104 and 123 may include personal computers, mobile communication devices, and other devices that can send and receive data over a network communicably connecting the devices 104 and 123 and the system 108. The network, such as a local area network ("LAN"), wide area network ("WAN"), the Internet, or a combination thereof, connects the user devices 104 and 123 and the system 108. In some implementations, the system 108 includes one or more servers. The system 108 may use a single server computer or multiple server computers operating in conjunction with one another, including, for example, a set of remote computers deployed as a cloud computing service.

The system 108 can include several different functional components, including the program parser 110, the micro-service engine 116, the request module 126, the micro-service processor 130, and the cached data module 134. The program parser 110, the micro-service engine 116, the request module 126, the micro-service processor 130, or the cached data module 134, or a combination of these, can include one or more data processing apparatuses, can be implemented in code, or a combination of both. For instance, each of the program parser 110, the micro-service engine 116, the request module 126, the micro-service processor 130, and the cached data module 134 can include one or more data processors and instructions that cause the one or more data processors to perform the operations discussed herein.

The various functional components of the system 108 may be installed on one or more computers as separate functional components or as different modules of a same functional component. For example, any of the program parser 110, the micro-service engine 116, the request module 126, the micro-service processor 130, or the cached data module 134 of the system 108 can be implemented as computer programs installed on one or more computers in one or more locations that are coupled to each through a network. In cloud-based systems for example, these components can be implemented by individual computing nodes of a distributed computing system.

Figure 2:
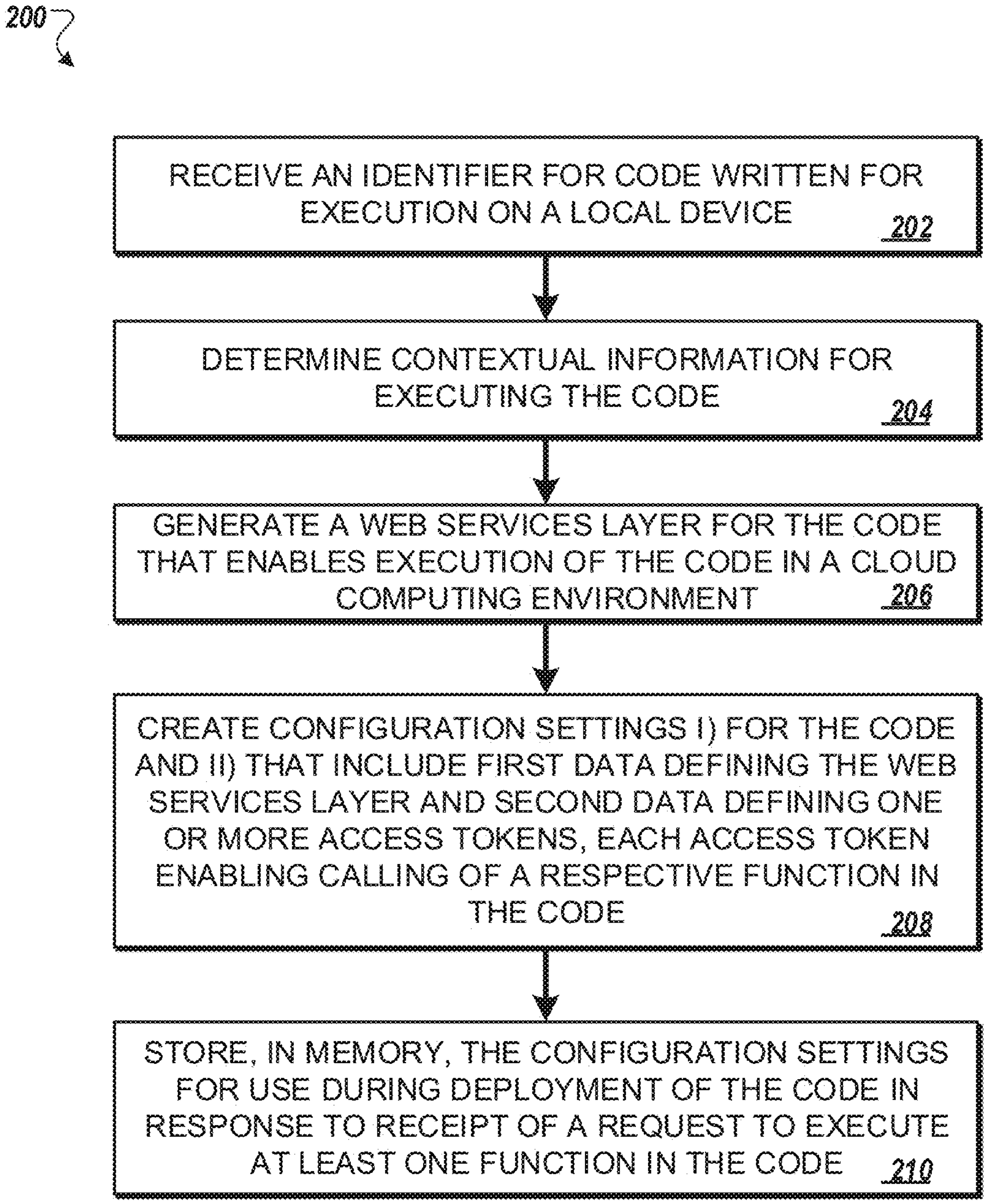
FIG. 2 is a flow diagram illustrating an example of a process for web application generation.

FIG. 2 is a flow diagram illustrating an example of a process 200 for web application generation. The process 200 may be performed by one or more electronic systems, for example, the system 108 of FIG. 1.

The process 200 includes receiving an identifier for code written for execution on a local device (202). The identifier can include a URL that indicates a location at which the code is stored, e.g., on an online repository or another location. In some examples, the identifier can include a name for a file that includes the code when the system 108 receives the file itself. In some implementations, the local device code 106 includes an identifier for code stored in a repository, such as an online storage repository. The system 108 can access one or more functions of the local device code 106 by obtaining code from a repository identified by the identifier.

The process 200 includes determining contextual information for executing the code (204). For example, determining contextual information can include determining, for one or more variables in code, e.g., the local device code 106, whether a value for a given variable should be defined prior to execution of the code or in response to receipt of a request to execute the code. In some implementations, the system 108 sets one or more variables for one or more functions of the micro-service 118. This can be especially useful in functions that require many variables (e.g., 10, 100, 1000), such as image processing, machine learning applications, among others.

In some implementations, determining contextual information includes determining, for variables from one or more variables for which a value for the variable should be defined prior to execution of the code, a corresponding default value. For example, an image processing function can include one or more variables that control granularity of parsing an image that affect a runtime or accuracy of resulting output. If a submitting device, such as the first user device 104, does not provide a value, the system 108 can include a default value, e.g., previously used and stored variables for the given function or similar functions, among others.

In some implementations, creating configuration settings includes creating configuration settings that include corresponding default values for a given variable from one or more variables for which a value for the variable should be defined prior to execution of the code.

In some implementations, determining contextual information includes determining one or more dependencies. For example, the system 108 can determine one or more dependencies, such as code called by one or more functions identified by the program parser 110 in the local device code 106. The system 108 can use the contextual information to generate output from a service based on a given request.

The process 200 includes generating a web services layer for the code that enables execution of the code in a cloud computing environment (206). For example, the micro-service engine 116 can generate a web services layer for the local device code 106. In some implementations, the web services layer is a micro-service that is callable by another device. The other device can have the same operating platform or a different operating platform as that used by the submitting device. For example, the second user device 123 can call a generated micro-service as a web services layer. The system 108 can obtain the request and generate output results for the second user device 123. The web services layer generated by the micro-service engine 116 can be operated by one or more processors on one or more communicably connected servers.

The process 200 includes creating configuration settings i) for the code and ii) that include first data defining the web services layer and second data defining one or more access tokens, each access token enabling calling of a respective function in the code (208). For example, the micro-service engine 116 can generate configuration settings for one or more functions of the micro-service 118 generated by the micro-service engine 116. In some implementations, configuration settings include one or more variables to be set by input from a requesting user or set using a default value. In some implementations, an access token includes a unique identifier for a given service. For example, the service request 124 can include an identifier that operates as a token to provide access, for the second user device 123, to output for a given service and associated one or more functions. In some implementations, first data defining the web services layer or generated service includes a string of one or more characters parsed from the local device code 106.

The process 200 includes storing, in memory, the configuration settings for use during deployment of the code in response to receipt of a request to execute at least one function in the code (210). For example, the micro-service engine 116 can generate the micro-service 118 and store the micro-service 118 in the service database 120. The system 108 can obtain and process subsequent requests, such as the service request 124, by processing one or more functions of the micro-service 118 to generate service results, such as the service result 132.

In some implementations, the process 200 can include additional steps, fewer steps, or some of the steps can be divided into multiple steps. For example, the process 200 can include steps 204 through 208 without the other steps in the process.

In some implementations, the process 200 can include determining whether a request, received a) while a first deployment of the code is deployed for a first device and b) from a second different device, for output from the code should be processed by the first deployment of the code or a second different deployment of the code. For example, deployments of code can include changes which affect output generated by one or more functions defined by code.

In some implementations, the process 200 can include creating configuration settings that include creating configuration settings that indicate whether a request, received a) while a first deployment of the code is deployed for a first device and b) from a second different device, for output from the code should be processed by the first deployment of the code or a second different deployment of the code. For example, if a request is received when a first deployment of code is active and before the system 108 obtains a second deployment or version of code, the system 108, or the micro-service processor 130 can process the request and provide a service result using the first deployment. In some cases, the system 108 can use the first deployment even if code is updated before the system 108 processes the request.

Figure 3:
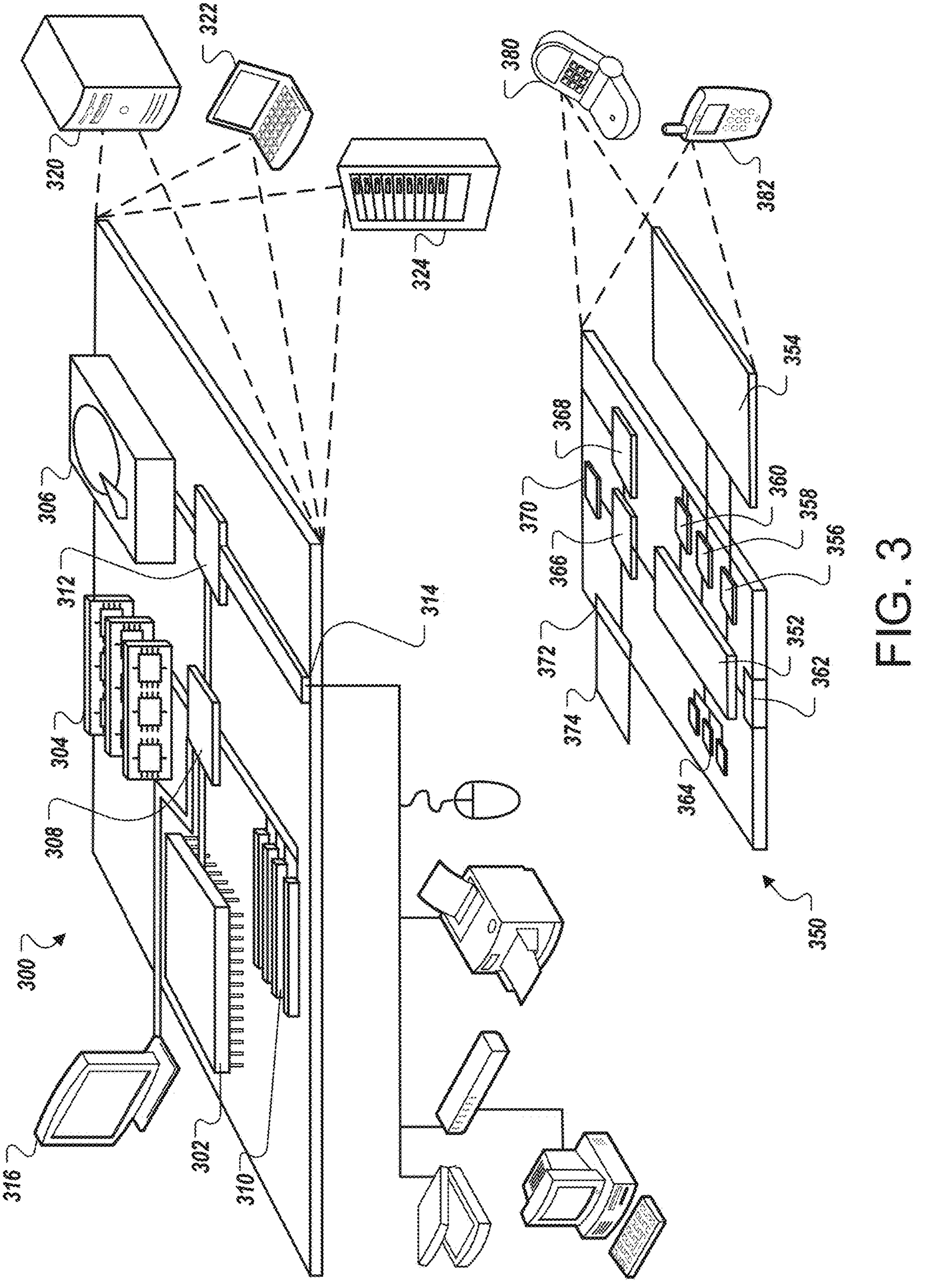
FIG. 3 is a block diagram of computing devices that may be used to implement systems or methods for web application generation.

FIG. 3 is a block diagram of computing devices 300, 350 that may be used to implement the systems and methods described in this specification, as either a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this specification.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor

302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer-or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of duties is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication (e.g., via a docking procedure) or for wireless communication (e.g., via Bluetooth or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to device 350 through expansion interface 372, which may include, for example, a SIMM card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer-or machine-readable medium, such as the memory 364, expansion memory 374, or memory on processor 352.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS receiver module 370 may provide additional wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A system comprising one or more computers and one or more storage devices on which are stored instructions that are operable, when executed by the one or more computers, to cause the one or more computers to perform operations comprising:

maintaining, in one or more memories, i) first data defining a web services layer for code written for execution on a local device, wherein the web services layer enables execution of the code in a cloud computing environment, and ii) second data defining one or more access tokens for deployment of the code in the cloud computing environment, wherein each access token of the one or more access tokens enables calling of a respective function in the code;

receiving, from a client device, a request to generate a response by the code;

generating the response by the code using the first data defining the web services layer for the code, and the second data defining the one or more access tokens for deployment of the code;

sending, to the client device, the response for execution;

deploying the code in the cloud computing environment in response to receipt of a request to execute at least one function in the code; and executing the at least one function in the code in the cloud computing environment using the web services layer for the code.

2. The system of claim 1, wherein the web services layer for the code was generated using contextual information for executing the code.

3. The system of claim 1, wherein:

receiving the request to generate the response by the code comprises receiving the request that includes input data and a first identifier for the code; and generating the response by the code comprises:

determining, using the first identifier for the code, the first data defining the web services layer for the code, and the second data defining the one or more access tokens for deployment of the code; and generating the response by the code using the input data, the first data defining the web services layer for the code, and the second data defining the one or more access tokens for deployment of the code.

4. The system of claim 3, the operations further comprising:

determining a form of the input data; and determining whether the form of the input data satisfies a predetermined input data form for the code, wherein generating the response by the code uses a result of the determination whether the form of the input data satisfies the predetermined input data form for the code.

5. The system of claim 4, the operations further comprising:

determining that the form of the input data satisfies the predetermined input data form for the code; and in response to determining that the form of the input data satisfies the predetermined input data form for the code, determining to skip generating converted input data by converting the form of the input data to the predetermined input data form for the code, wherein generating the response by the code uses unconverted input data, the first data defining the web services layer for the code, and the second data defining the one or more access tokens for deployment of the code.

6. The system of claim 4, the operations further comprising:

determining that the form of the input data does not satisfy the predetermined input data form for the code; and in response to determining that the form of the input data does not satisfy the predetermined input data form for the code, generating converted input data by converting the form of the input data to the predetermined input data form for the code, wherein generating the response by the code uses the converted input data, the first data defining the web services layer for the code, and the second data defining the one or more access tokens for deployment of the code.

7. The system of claim 6, wherein generating the converted input data comprises:

determining an input conversion process by accessing, using a second identifier for the code, a record in a look up table; and generating the converted input data using the input conversion process.

8. One or more non-transitory computer storage media encoded with instructions that, when executed by one or more computers, cause the one or more computers to perform operations comprising:

maintaining, in one or more memories, i) first data defining a web services layer for code written for execution on a local device, wherein the web services layer enables execution of the code in a cloud computing environment, and ii) second data defining one or more access tokens for deployment of the code in the cloud computing environment, wherein each access token of the one or more access tokens enables calling of a respective function in the code;

receiving, from a client device, a request to generate a response by the code;

generating the response by the code using the first data defining the web services layer for the code, and the second data defining the one or more access tokens for deployment of the code;

sending, to the client device, the response for execution;

deploying the code in the cloud computing environment in response to receipt of a request to execute at least one function in the code; and executing the at least one function in the code in the cloud computing environment using the web services layer for the code.

9. The one or more non-transitory computer storage media of claim 8, wherein the web services layer for the code was generated using contextual information for executing the code.

10. The one or more non-transitory computer storage media of claim 8, wherein:

receiving the request to generate the response by the code comprises receiving the request that includes input data and a first identifier for the code; and generating the response by the code comprises:

determining, using the first identifier for the code, the first data defining the web services layer for the code, and the second data defining the one or more access tokens for deployment of the code; and generating the response by the code using the input data, the first data defining the web services layer for the code, and the second data defining the one or more access tokens for deployment of the code.

11. The one or more non-transitory computer storage media of claim 10, the operations further comprising:

determining a form of the input data; and determining whether the form of the input data satisfies a predetermined input data form for the code, wherein generating the response by the code uses a result of the determination whether the form of the input data satisfies the predetermined input data form for the code.

12. The one or more non-transitory computer storage media of claim 11, the operations further comprising:

determining that the form of the input data satisfies the predetermined input data form for the code; and in response to determining that the form of the input data satisfies the predetermined input data form for the code, determining to skip generating converted input data by converting the form of the input data to the predetermined input data form for the code, wherein generating the response by the code uses unconverted input data, the first data defining the web services layer for the code, and the second data defining the one or more access tokens for deployment of the code.

13. The one or more non-transitory computer storage media of claim 11, the operations further comprising:

determining that the form of the input data does not satisfy the predetermined input data form for the code; and in response to determining that the form of the input data does not satisfy the predetermined input data form for the code, generating converted input data by converting the form of the input data to the predetermined input data form for the code, wherein generating the response by the code uses the converted input data, the first data defining the web services layer for the code, and the second data defining the one or more access tokens for deployment of the code.

14. The one or more non-transitory computer storage media of claim 13, wherein generating the converted input data comprises:

determining an input conversion process by accessing, using a second identifier for the code, a record in a look up table; and generating the converted input data using the input conversion process.

15. A computer-implemented method comprising:

maintaining, in one or more memories, i) first data defining a web services layer for code written for execution on a local device, wherein the web services layer enables execution of the code in a cloud computing environment, and ii) second data defining one or more access tokens for deployment of the code in the cloud computing environment, wherein each access token of the one or more access tokens enables calling of a respective function in the code;

receiving, from a client device, a request to generate a response by the code;

generating the response by the code using the first data defining the web services layer for the code, and the second data defining the one or more access tokens for deployment of the code;

sending, to the client device, the response for execution;

deploying the code in the cloud computing environment in response to receipt of a request to execute at least one function in the code; and executing the at least one function in the code in the cloud computing environment using the web services layer for the code.

16. The computer-implemented method of claim 15, wherein the web services layer for the code was generated using contextual information for executing the code.

17. The computer-implemented method of claim 15, wherein:

receiving the request to generate the response by the code comprises receiving the request that includes input data and a first identifier for the code; and generating the response by the code comprises:

determining, using the first identifier for the code, the first data defining the web services layer for the code, and the second data defining the one or more access tokens for deployment of the code; and generating the response by the code using the input data, the first data defining the web services layer for the code, and the second data defining the one or more access tokens for deployment of the code.

18. The computer-implemented method of claim 17, further comprising:

determining a form of the input data; and determining whether the form of the input data satisfies a predetermined input data form for the code, wherein generating the response by the code uses a result of the determination whether the form of the input data satisfies the predetermined input data form for the code.

19. The computer-implemented method of claim 18, further comprising:

determining that the form of the input data satisfies the predetermined input data form for the code; and in response to determining that the form of the input data satisfies the predetermined input data form for the code, determining to skip generating converted input data by converting the form of the input data to the predetermined input data form for the code, wherein generating the response by the code uses unconverted input data, the first data defining the web services layer for the code, and the second data defining the one or more access tokens for deployment of the code.

20. The computer-implemented method of claim 18, further comprising:

determining that the form of the input data does not satisfy the predetermined input data form for the code; and in response to determining that the form of the input data does not satisfy the predetermined input data form for the code, generating converted input data by converting the form of the input data to the predetermined input data form for the code, wherein generating the response by the code uses the converted input data, the first data defining the web services layer for the code, and the second data defining the one or more access tokens for deployment of the code.

* * * * *